United States Patent [19]

Mathews

[11] Patent Number: 4,980,519
[45] Date of Patent: Dec. 25, 1990

[54] THREE DIMENSIONAL BATON AND GESTURE SENSOR

[75] Inventor: Max V. Mathews, Stanford, Calif.

[73] Assignee: The Board of Trustees of the Leland Stanford Jr. Univ., Stanford, Calif.

[21] Appl. No.: 487,660

[22] Filed: Mar. 2, 1990

[51] Int. Cl.$^5$ .............................................. G08C 21/00
[52] U.S. Cl. ....................................... 178/19; 84/733; 84/735; 84/741; 84/744
[58] Field of Search ...................... 178/18, 19; 84/687, 84/689, 692, 711, 719, 720, 733, 735, 741, 744, 745, DIG. 12

[56] References Cited

U.S. PATENT DOCUMENTS

| | | | |
|---|---|---|---|
| 4,560,830 | 12/1985 | Perl ........................................ | 178/19 |
| 4,687,885 | 8/1987 | Talmage et al. ....................... | 178/18 |
| 4,892,023 | 1/1990 | Takechi et al. ........................ | 84/687 |

*Primary Examiner*—Stafford D. Schreyer
*Attorney, Agent, or Firm*—Flehr, Hohback, Test, Albritton & Herbert

[57] ABSTRACT

An electronic drum has two or more batons, each baton having a transmitter which transmits a distinct radio frequency signal at a position in space. The electronic drum determines the current X, Y, and Z coordinates of each baton transmitter. To determine the position of each baton transmitter, the drum includes a tablet which has a flat support member at a predefined position, with at least two pairs of electrodes coupled to the flat support member. A first pair of the electrodes is shaped so that the amount of capacitive coupling between each baton transmitter and one of the first pair of electrodes corresponds to the position of the baton transmitter with respect to the X axis. A second pair of electrodes is shaped so that the amount of capacitive coupling between each baton transmitter and one of the second pair of electrodes corresponds to the position of the baton transmitter with respect to the Y axis. The electrodes pairs are shaped and positioned so that neither electrode pair shields the other, which allows for accurate X and Y position measurements. The drum also has a CPU which receives signals from the electrodes, and uses those signals to compute the X, Y and Z coordinates of each baton. The CPU also predicts when each baton transmitter will hit the drum's flat support member and generates a signal at the predicted time so that a music synthesizer can generate a sound at the appropriate time.

8 Claims, 4 Drawing Sheets

THREE DIMENSIONAL BATON AND GESTURE SENSOR

The present invention relates generally to man-machine interfaces and particularly to methods and systems for sensing the motion of a stylus, pointer, drum stick or baton over a surface.

BACKGROUND OF THE INVENTION

The present invention is a motion and position sensor which can be used as an electronic drum, much like an electronic keyboard is used with a musical synthesizer. The present invention can also be used for inputting one-dimensional, two-dimensional or three-dimensional data points into a computer of any other system.

The present invention uses a capacitive two dimensional tablet which is similar in some respects to the digitizer described in U.S. Pat. No. 4,705,919, and the capacitive two dimensional tables shown in U.S. Pat. Nos. 3,999,012 and 4,087,625. The present invention is an improvement on these prior art devices in that it detects the Z coordinate of a baton or stylus, corresponding to the height of the baton or stylus over a surface, as well as the X and Y coordinates of the baton or stylus. An additional improvement over the prior art is that the signals used in the present invention to determine the X coordinate are completely separate from the signals used to determine the Y coordinate, which simplifies the calculations and improves the accuracy of the X and Y coordinates.

In prior art motion and position sensors, there is a time lag between the motion of the stylus or baton being used, and the generation of the corresponding signals. This is acceptable for many applications, but is not acceptable when the baton is being used with a musical synthesizer to control when certain musical sounds are generated.

The present invention has advantages in terms of the accuracy of the X and Y coordinate data that it generates, and also in that it uses a predictive method of determining when a baton will hit a surface. This is particularly useful in musical applications, where it is important that the generation of a drum beat or other musical event be accurately synchronized with a drum player's hand motions.

Another object of the present invention is to provide a motion or position sensor that can simultaneously detect the positions to two or more batons. Once again this is particularly useful in musical applications, where a drum player will typically use two drum sticks, and may use more than two sticks.

SUMMARY OF THE INVENTION

In summary, the present invention is a radio signal actuated electronic drum which has two or more batons. Each baton has a transmitter which transmits a distinct radio frequency signal at a position in space. The electronic drum determines the current position of each baton transmitter in terms of X, Y, and Z coordinates.

To determine the position of each baton transmitter, the drum includes a tablet which has a flat support member at a predefined position, with at least two pairs of electrodes coupled to the flat support member. A first pair of the electrodes is shaped so that the amount of capacitive coupling between each baton transmitter and one of the first pair of electrodes corresponds to the position of the baton transmitter with respect to the X axis. A second pair of the electrodes is shaped so that the amount of capacitive coupling between each baton transmitter and one of the second pair of electrodes corresponds to the position of the baton transmitter with respect to the Y axis. The electrodes pairs are shaped and positioned so that neither electrode pair shields the other, which allows for accurate X and Y position measurements.

The drum also has a CPU which receives signals from the electrodes, and uses those signals to compute the X, Y and Z coordinates of each baton. The Z position of the baton transmitter is inversely proportional to the total capacitative coupling between the baton and either pair of electrodes. The CPU also predicts when each baton transmitter will hit the drum's flat support member and generates a corresponding trigger signal so that a music synthesizer can generate a sound at the appropriate time.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figures 1, 1A:
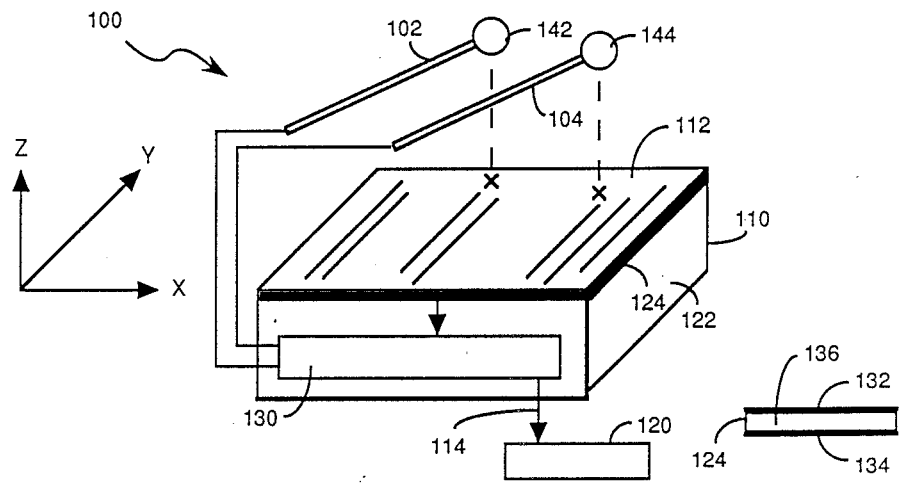
FIG. 1 is a conceptual diagram of the present invention.
FIG. 1A depicts a cross-sectional view of a capacitive tablet.

Referring to FIG. 1, there is shown a motion and position sensing system 100, which includes batons 102 and 104 and a position sensor 110. The sensor 110 detects the (X,Y,Z) position of each of the batons relative to its top surface 112, and generates corresponding position signals on line 114. In addition, if the batons are used as drum sticks, the sensor generates and transmits timing signals on line 114 which are synchronized with the movement of the batons so that these timing signals are generated at times which closely correspond to the time that the batons impact on the sensor's surface.

In the preferred embodiment, the position sensing system 100 is used in conjunction with a music synthesizer 120, and the position and timing signals transmitted over line 114 to the synthesizer are used to control various aspects of the synthesizer's operation. In a simple application, where the sensing system is used as a variable pitch drum, the X position of the baton 102 can be used to control the pitch of the drum beats generated by the synthesizer, the Y position of the baton 102 can be used to control the timbre of the drum, the velocity of the baton when it hits the surface 112 can be used to control the volume (also known as velocity) of the drum beats, and the timing signals are used to determine when the drum beats are to be generated.

In other applications of the present invention, the apparatus 120 which receives the signals output by the sensing system 100 may be a computer.

The position sensor 110 has a housing 122, which holds a sensing tablet 124 near its upper surface 112, and a signal processing circuit 130. Referring to FIG. 1A, the sensing tablet 124 has four separate antennae formed on two conductive layers 132 and 134 which are separated by an thin insulator layer 136 (e.g., an Invar layer that is 0.2 cm thick). In a preferred embodiment, the antennae (shown in FIGS. 2 and 3) are thin copper patterns which are formed on a printed circuit board base using standard etching techniques, similar to those used to form the conductive patterns on printed circuit boards.

At the ends of the batons are small, radio frequency transmitters 142 and 144. The amount of capacitive coupling between a baton transmitter 142 and each of the four antennae in the sensor 110 is measured by measuring the strength of the RF signal received by each of the four antennae at the frequency which corresponds to that baton. More specifically, each baton transmitter 142 and 144 transmits a radio frequency signal with a distinct frequency, and the sensor 110 determines the strength of the signals at each frequency which is received by each of the four antennae.

Figure 2:
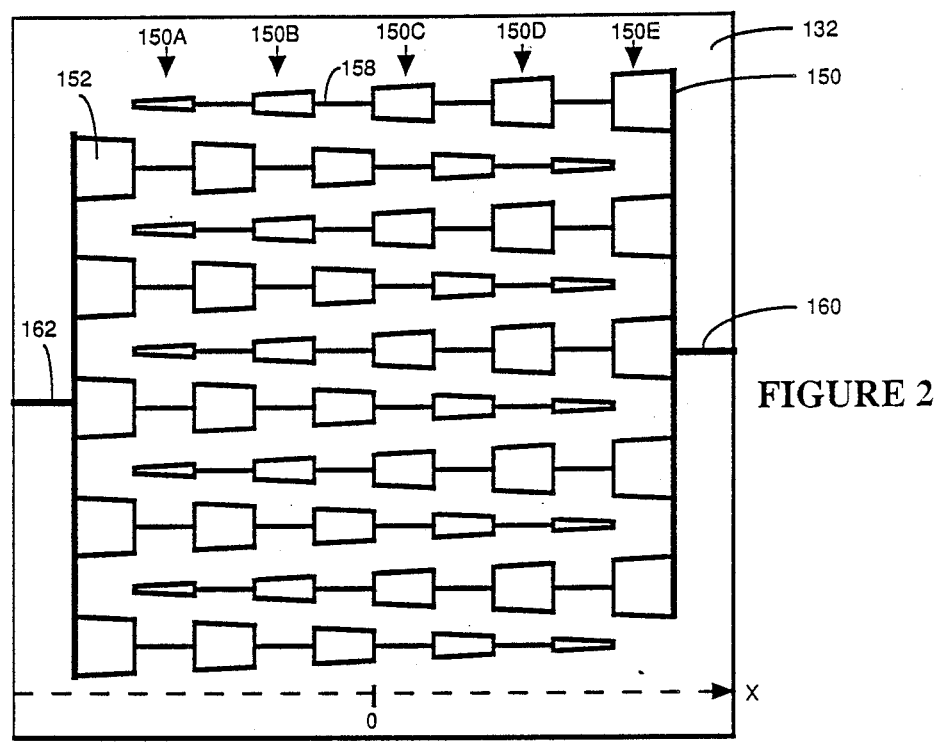
FIGS. 2 and 3 depict the capacitive electrodes used in a preferred embodiment of the present invention.
Figure 3:
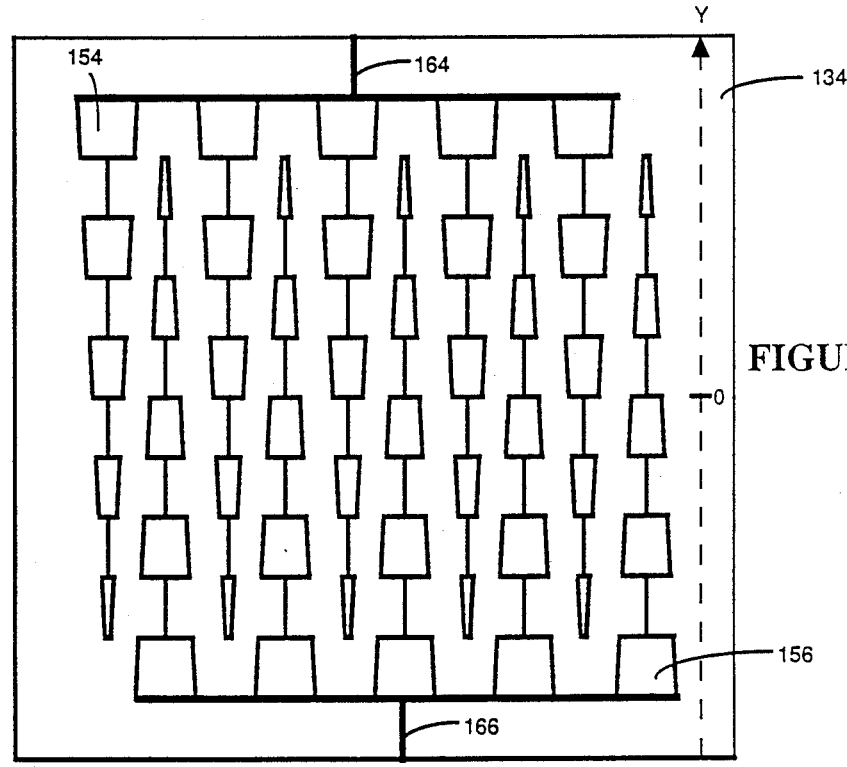

Referring to FIGS. 2 and 3, there are shown two pairs of antennae 150–152 and 154–156. Antennae 150 and 152 are formed on layer 132 (see FIG. 1A) and antennae 154 and 156 are formed on layer 134. Each antenna, such as antenna 150, is formed from a plurality of tapered or wedge shaped regions 150A–150E. Since antenna 150 and 152 are to be used to measure the X coordinate of a baton, the wedge shaped regions are tapered so that the size of each region in the antenna is linearly proportional to its position along the X axis (shown with a dashed X-axis line in FIG. 2). Similarly, antennae 154 and 156 have wedge shaped regions that are tapered so that the size of each region in the antenna is linearly proportional to its position along the Y axis (shown with a dashed X-axis line in FIG. 3).

Figure 4:
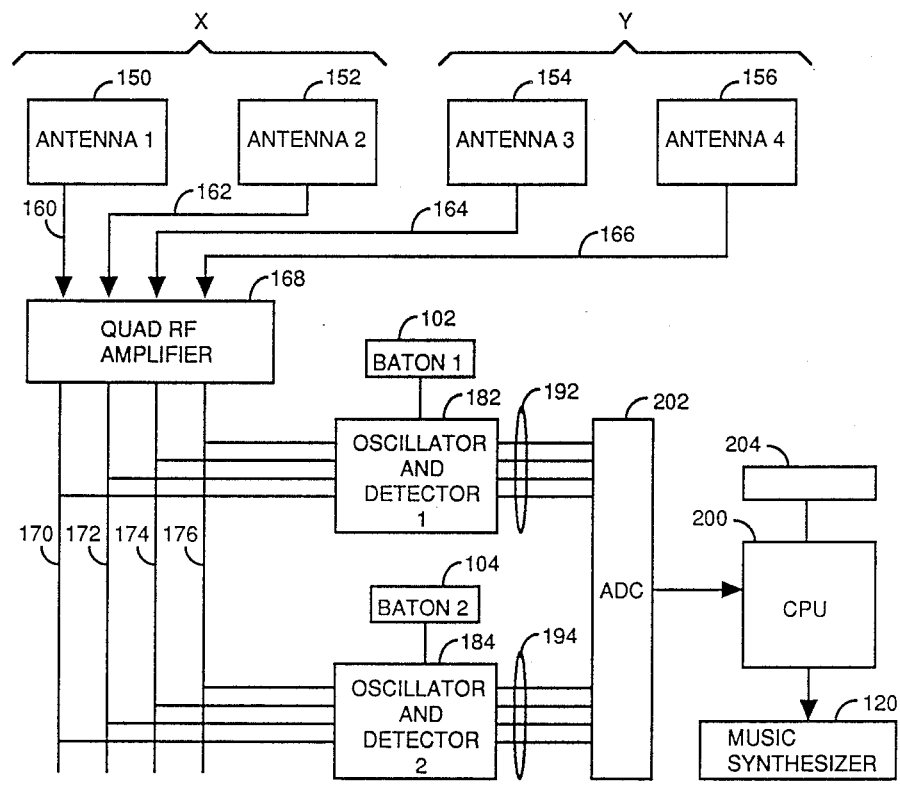
FIG. 4 is a block diagram of a system incorporating the present invention.

The radio frequency signals received by each of these four antennae 150–156, via capacitive coupling between the batons and the antennae, are carried on lines 160, 162, 164 and 166 to a set of four RF amplifiers (see FIG. 4).

As shown, the wedge shaped regions in each antennae are interconnected by thin connection lines 158. An advantage of this antennae pattern is that the two antennae 150 and 152 on layer 132 do not overlap the antennae 154 and 156 on layer 134 (except for the connection lines 158), and therefore the conductive materials in antennae 150 and 152 do not shield antennae 154 and 156 from the batons.

Given a set of four voltages, VX1, VX2, VY1 and VY2, which correspond to the signal strengths of the signals received from a baton 102 by the four antennae 150, 152, 154 and 156 respectively, the position of the first baton 102, denoted here as (X1, Y1, Z1), can be calculated as follows:

$$VT = VX1 + VX2 + VY1 + VY2$$

$$X1 = K1 \times VX1/(VX1 + VX2)$$

$$Y1 = K2 \times VY1/(VY1 + VY2)$$

$$Z = K3/VT \qquad (Eq. 1)$$

where K1, K2 and K3 are scaling or calibrating factors so that the position of the baton can be expressed in a convenient set of units, such as millimeters. The same calculation is used to determine the (X2, Y2, Z2) position of the second baton 104, except that the voltages used in this second calculation correspond to the strength of the signals received at the frequency transmitted by the second baton 104.

Note that the Z coordinate can also be calculated as being inversely proportional to the sum of the signals from just one pair of antennae, such as antennae 150 and 152 (i.e., Z1=K3/(VX1+VX2).

Referring now to FIG. 4, and as described above, the sensor 110 contains four antennae 150, 152, 154 and 156. The radio frequency signals received by each of these four antennae, via capacitive coupling between the batons and the antennae, are carried on lines 160, 162, 164 and 166 to a set of four RF amplifiers 168, which generate four amplified antenna signals on lines 170, 172, 174 and 176.

For each baton 102, 104 there is an oscillator and detector circuit 182, 184 which generates an RF signal at a distinct RF frequency, and which also detects the strength of the four antennae signals on lines 170–176 at that RF frequency. The detector 182 generates four dc voltage signals on lines 192 which correspond to the strengths of the four antennae signals at the RF frequency transmitted by baton 102. Similarly, detector 184 generates four dc voltage signals on lines 194 which correspond to the strengths of the four antennae signals at the RF frequency transmitted by baton 104.

The dc voltage signals which represent the strengths of the antennae signals from each of the baton are then read into a small digital computer or CPU 200 via an analog to digital converter (ADC) 202, which sequentially converts each of the voltage signals into a ten or twelve bit binary value, depending on the particular ADC 202 used. All eight voltage signals are read by the CPU 200 on a periodic basis (e.g., one thousand times per second) and then the CPU, under the control of software 204, uses these received values to compute the X, Y, and Z coordinates of each of the batons 102 and 104. These values are then converted into MIDI control parameters which are transmitted to a standard music synthesizer, such as the Yamaha DX7, which then responds to those MIDI control parameters by generating corresponding musical sounds.

In the preferred embodiment we use parameters X1, Y1 and Z1 to denote the (X,Y,Z) position of the transmitter at the end of the first baton 102, and we use X2, Y2 and Z2 to denote the position of the transmitter at the end of the second baton 104. Given these six parameters, the X1 and Y1 parameters may be used to control the frequency and volume of a first MIDI channel, and X2 and Y2 may be used to control the frequency and volume of a second MIDI channel. A MIDI event, comprising a note or drumbeat, is then played on each MIDI channel whenever the corresponding Z value reaches a predefined threshold value (e.g., Z=0), which corresponds to the baton hitting the surface 112 of the sensor 110.

Figure 5:
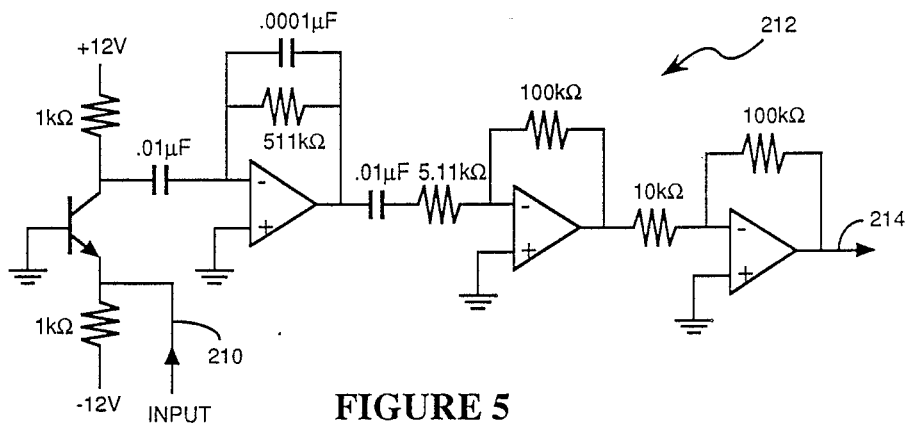
FIG. 5 depicts a radio frequency amplifier.

FIG. 5 shows one of the four radio frequency amplifiers used in the quad RF amplifier 168. The input signal on line 210 of this RF amplifier 212 is coupled to one of the four antenna lines 160-166. The output signal on line 214 of this RF amplifier is coupled to one of the four lines 170-176 going to the detector circuits (see FIG. 4). This three stage preamplifier circuit 212 is suitable for amplifying the range of RF signals used in the preferred embodiment.

Figure 6:
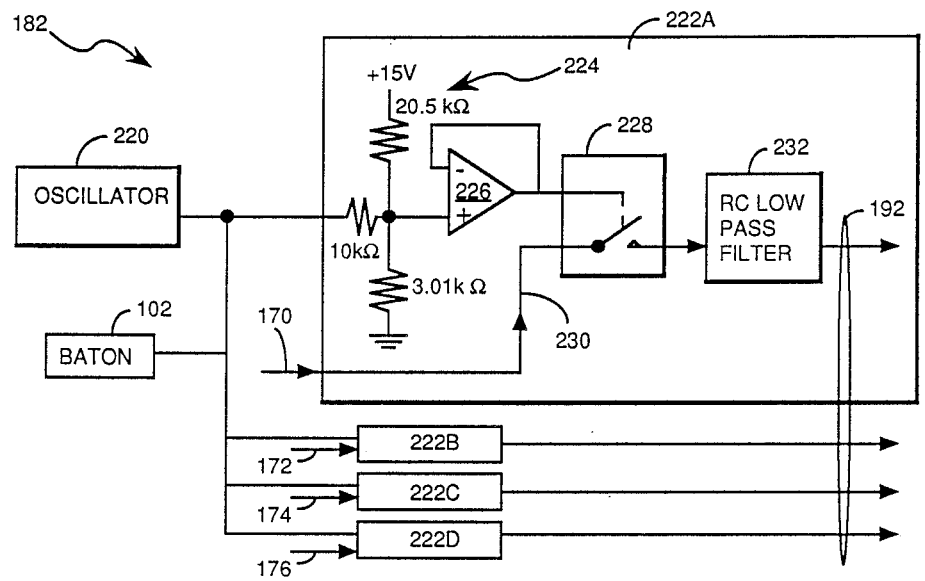
FIG. 6 depicts an oscillator and radio frequency signal detector.

FIG. 6 shows an oscillator and signal detector 182, including an oscillator 220 which generates a periodic signal having a period of 13.2 microseconds, which corresponds to a frequency of 75.76 Khz. The oscillator 220 is coupled to four RF signal detectors 222A-222D as well as one of the batons 102. Thus, the same RF signal from the oscillator 220 is used to generate the RF signal transmitted by one of the batons 102 and to drive a set of four RF signal detectors 222A-222D.

For each distinct baton 102 or 104, there is a corresponding oscillator 220 and set of four RF signal detectors 222A-222D. Each baton uses a distinct RF frequency so that the signals from each baton can be separately detected. While the preferred embodiment has just two batons, other embodiments could use three, four or more batons, each with its own oscillator having a distinct RF frequency and a corresponding set of RF signal detectors.

Each radio frequency signal detector circuit 222 includes an input voltage divider 224, followed by an operational amplifier 226 (e.g., an LF347), followed by a sampling circuit 228 (e.g., an LF13202) which samples an amplified input signal on line 230 at the running frequency of the oscillator circuit 220. Input line 230 is coupled to output line 170 of one of the RF amplifiers, such as the one shown in FIG. 5. The input lines of the other three RF signal detector circuits 222B, 222C and 222D are coupled to the output signal lines 172, 174 and 176 of the other RF amplifiers (see FIG. 4).

The output of the sampling circuit 228 is filtered by an RC low pass filter 232 so as to produce a stable dc output signal on line 192, which is proportional to the strength of the RF signal received by one of the antennae.

Figure 7:
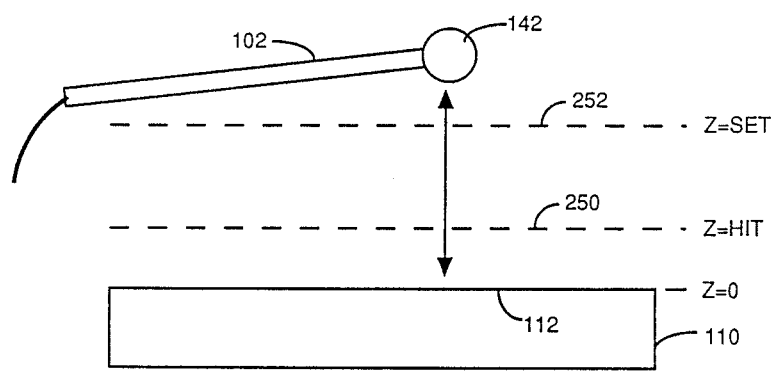
FIG. 7 schematically depicts a baton and a drum surface.

FIG. 7 schematically depicts a baton 102 and a drum surface 112 of the position sensor 110. The present invention is designed to (1) generate a timing signal which closely corresponds to the exact time that the baton hits the surface 112, and (2) prevents the generation of multiple timing signal if the baton 102 bounces up and down very close to the surface 112 without first rising up sufficiently high to indicate that a new drum beat is being performed. FIG. 7 shows two planes positioned above the drum surface: a first plane 250 which is immediately above the drum surface, and is assigned a position of Z=HIT, and a second plane 252 which is sufficiently high above the drum surface that when the baton rises from the drum surface 112 to this place 252 it can be safely assumed that the baton has been deliberately raised in preparation for performing the next drum beat. The Z position of this second plane is Z=SET, where SET is the height of the second plane above the drum surface 112.

Figure 8:
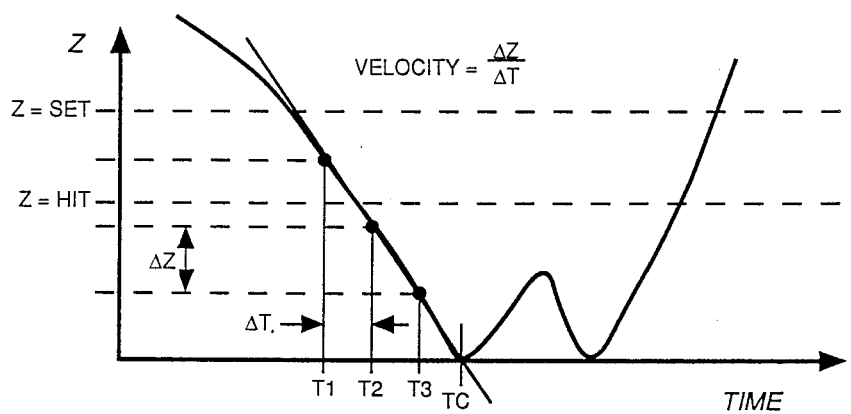
FIG. 8 graphically depicts the motion of a baton for the purpose of predicting when the baton will hit a surface.

Referring to FIG. 8, there is shown a graphical representation of the movement of a baton in the Z direction. In musical applications it is important that the generation of a drum beat or other musical event be accurately synchronized with a drum player's hand motions. However, there is an inherent delay $T_{delay}$ between the time that the sensor 110 detects the position of a baton and the time that the sensor 110 can generate corresponding signals, such as the signals denoting a MIDI event. To overcome this problem, the present invention uses a predictive method of determining when a baton will hit a surface.

As shown in FIG. 8, the sensor's CPU tracks the Z position at regularly spaced time intervals $\Delta T$. Whenever the baton 102 or 104 is raised above the set level (i.e., Z>SET), then a "baton debouncing register" is assigned a value of 1. When the baton is moved toward the sensor surface (Z=0) and goes below the hit level (i.e., Z<HIT) the baton debouncing register is assigned a value of 0 to prevent double triggering, and the sensor's CPU 200 calculates the velocity at which the baton is approaching the sensor surface:

$$\text{velocity} = \frac{Z_{last} - Z_{current}}{\Delta T} \qquad (\text{Eq. 2})$$

where $Z_{current}$ is the current Z position of the sensor, $Z_{last}$ is next most recently measured position of the sensor and $\Delta T$ is the amount of time between the current and previous measurements of the baton's position.

The sensor's CPU then calculates a predicted impact time TC (i.e., a predicted time at which the baton will hit the surface of the sensor):

$$TC = T_{current} + \frac{Z_{current}}{\text{velocity}} \qquad (\text{Eq. 3})$$

where TC is the predicted time of impact and $T_{current}$ is the current time. The sensor's CPU then sends a trigger signal, including the predicted impact time TC and the baton's X, Y and Z coordinate values, to a computer or music synthesizer 120.

Note that only one trigger signal will be sent to the computer or music synthesizer until the baton is raised above the set level Z>SET. Furthermore, the hit plane 250 is placed sufficiently high above the sensor surface 112 so that the travel time of the baton from the hit plane 250 to the sensor surface 112 is longer than the sensor's calculation delay $T_{delay}$.

Figure 9:
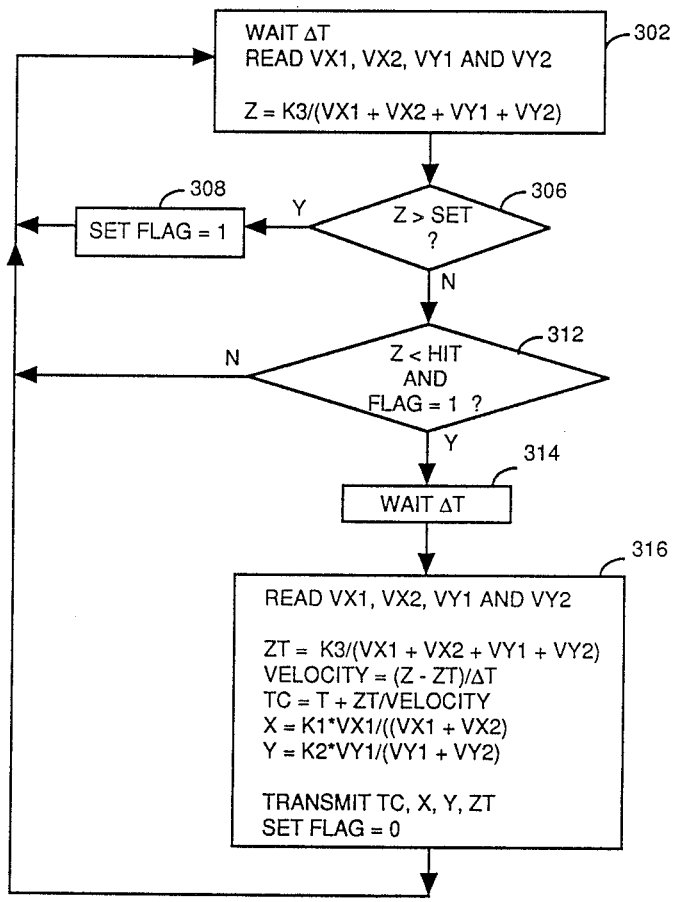
FIG. 9 is a flow chart of the software used in a preferred embodiment of the present invention, including a method of predictively determining when a baton will hit a surface.

FIG. 9 is a flow chart of the software 204 used by the CPU 200 in a preferred embodiment of the present invention, including a method of predictively determining when a baton will hit a surface. The program diagrammed in FIG. 9 will send reliable trigger signals to a computer along with the X and Y positions of the baton at the trigger time. This information can be used in many ways. If it is desired to control a precussive synthesizer such as a drum or piano synthesizer, a note can be played at each trigger, with the pitch of the note determined by the value of X and the timbre determined by Y.

It should be noted the sensor system simultaneously runs a separate copy of the program diagrammed in FIG. 9 for each baton used, and that these programs are run in parallel by a multitasking CPU 200. Thus, while one baton program is waiting for the next time interval, the other baton programs are run by the CPU.

The program (for a single baton) begins by waiting one time interval (i.e., $\Delta T$), then reading in the antennae signals for the baton (box 302) and computing the Z position of the baton. If the baton is above the set plane (box 306), the software makes sure that the flag for the baton is set (box 308), and the waits for the next time interval (box 302). If the baton is below the set plane, the software checks to see if the baton is below the hit plane and also checks the baton's flag (box 312), which indicates whether a trigger signal denoting the impact time TC of the baton on the sensor's surface has already been transmitted. If a trigger signal has already been transmitted, or the baton is not below the hit plane, the software returns to the beginning of the program (box 302).

If the baton has not already hit the sensor's surface (box 312) and is below the hit plane, the sensor software waits for one time interval (box 314). Then it reads in the antennae signals for the baton, computes current Z position of the baton (ZT), the velocity of the baton (i.e., the rate at which the baton is moving toward the sensor's surface) and the expected time of impact TC (box 316). The X and Y positions of the baton are also computed. Then a trigger signal is transmitted (e.g., to a synthesizer), including the predicted impact time TC, and the current X, Y and Z position of the baton. Finally, the baton's flag is cleared to prevent double triggering.

If it is desired to control a more complex music synthesizer which contains a sequencer, the time between the most recent two triggers can be used to set the tempo at which a sequence of notes are played. In such a system the X and Y variables can control global factors such as the loudness and timbre of the entire sequence of notes.

With a slight variation of the program in FIG. 9, the radio drum apparatus can send a continuous stream of information to the computer. In this case, the program will compute X, Y and Z (for each baton) and will send these data to the computer at each sampling time. The continuous stream of information can be used to control nonpercussive timbres such as violin timbres. For example, X might control loudness of the sound and Y the strength of the vibrato.

In many applications, the values of X and Y are meaningful only if the baton is close to the drum surface. The program can be made to send X and Y information (i.e., values) to the computer only when Z is less than a specified threshold. In this way, the computer will not be overloaded with meaningless information.

In yet other variations of the program in FIG. 9, the program can be arranged so that one baton sends trigger signals to the computer and another baton sends a continuous stream of X, Y and Z values. Alternatively, the same baton can send both triggers and a continuous stream of X, Y and Z values to a computer. If desired, X and Y values can be sent only while the baton is close to the surface of the drum immediately subsequent to generating a trigger signal. Thus the trigger can be used to initiate a note and the subsequent X and Y data can be used to shape the sound of the note.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A radio signal actuated position sensor, comprising:

moveable positioning means for generating a radio frequency signal at a specified position in space, said position being specifiable with respect to X, Y and Z axes;

antennae means comprising a flat support member with at least two pairs of electrodes coupled to said flat support member, a first pair of said electrodes being shaped so that capacitive coupling between said moveable positioning means and said first electrode pair corresponds to the position of said moveable positioning means with respect to said X axis, and a second pair of said electrodes being shaped so that capacitive coupling between said moveable positioning means and said second electrode pair corresponds to the position of said moveable positioning means with respect to said Y axis; and computation means for receiving signals from said electrodes, for computing X and Y position values of said moveable positioning means, and for computing a Z position value which is inversely proportional to the sum of said received signals.

2. A radio signal actuated position sensor as set forth in claim 1, wherein said flat support member has upper and lower surfaces separated by an insulating layer, said first electrode pair being coupled to one of said flat support member's surfaces and said second electrode pair being coupled to the other one of said flat support member's surfaces, said first and second electrode pairs being shaped and positioned on said flat support member so that the electrode pair coupled to said upper surface of said flat support member does not shield the electrode pair coupled to said lower surface of said flat support member from radio frequency signals generated by said moveable positioning means.

3. A radio signal actuated position sensor as set forth in claim 1, wherein said computation means further includes means for computing a sequence of Z position values at regularly spaced time intervals, for calculating the rate of change of said Z position values, and for using said rate of change to predict a point in time when said Z position value will reach a predefined value corresponding to the location of said flat support member.

4. A radio signal actuated position sensor as set forth in claim 3, wherein said computation means further includes means for generating an output signal which coincides in time with said predicted point in time.

5. A radio signal actuated position sensor as set forth in claim 4, said computation means further including software debouncing means for preventing the generation of a second output signal after generating a first output signal, until such time that said computed Z value first increases to a value larger than a predefined threshold value and then decreases to a value smaller than said predefined threshold value;

whereby small movements of said moveable positioning means near said flat support member do not cause the generation of multiple output signals.

6. A radio signal actuated electronic drum, comprising:

a baton with a transmitter which transmits a radio frequency signal at a position in space, the position of said baton transmitter being specifiable with respect to X, Y and Z axes;

a drum tablet having a flat support member at a predefined position with respect to said Z axis, said drum tablet having at least two pairs of electrodes coupled to said flat support member, a first pair of said electrodes being shaped so that capacitive coupling between said baton transmitter and said first electrode pair corresponds to the position of said baton transmitter with respect to said X axis, and a second pair of said electrodes being shaped so that capacitive coupling between said baton transmitter and said second electrode pair corresponds to the position of said baton transmitter with respect to said Y axis; and computation means for receiving signals from said electrodes, for computing X and Y position values of said baton transmitter, and for computing a Z position value which is inversely proportional to the sum of said received signals; said computation means further including means for predicting the time when said baton transmitter will reach the position of said flat support member and for generating a signal at said predicted time.

7. A radio signal actuated electronic drum as set forth in claim 6, wherein said flat support member has upper and lower surfaces separated by an insulating layer, said first electrode pair being coupled to one of said flat support member's surfaces and said second electrode pair being coupled to the other one of said flat support member's surfaces, said first and second electrode pairs being shaped and positioned on said flat support member so that the electrode pair coupled to said upper surface of said flat support member does not shield the electrode pair coupled to said lower surface of said flat support member from radio frequency signals generated by said baton transmitter.

8. A radio signal actuated electronic drum as set forth in claim 6, wherein said computation means further includes means for computing a sequence of Z position values at regularly spaced time intervals, for calculating the rate of change of said Z position values, and for using said rate of change to predict a point in time when said Z position value will reach a predefined value corresponding to the location of said flat support member.

* * * * *